(12) United States Patent
Okitsu et al.

(10) Patent No.: US 8,078,764 B2
(45) Date of Patent: Dec. 13, 2011

(54) METHOD FOR SWITCHING I/O PATH IN A COMPUTER SYSTEM HAVING AN I/O SWITCH

(75) Inventors: Jun Okitsu, Kodaira (JP); Yoshiko Yasuda, Tokorozawa (JP); Takashige Baba, Inagi (JP); Keitaro Uehara, Kokubunji (JP); Yuji Tsushima, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 466 days.

(21) Appl. No.: 12/222,959

(22) Filed: Aug. 20, 2008

(65) Prior Publication Data

US 2009/0198862 A1   Aug. 6, 2009

(30) Foreign Application Priority Data

Jan. 31, 2008   (JP) ................................ 2008-020923

(51) Int. Cl.
*G06F 3/00* (2006.01)

(52) U.S. Cl. .................. 710/5; 710/15; 710/17; 710/18; 710/19; 710/29; 710/31; 710/32; 710/36; 710/38; 710/39; 710/40; 710/48; 710/200; 710/240; 710/241; 710/242

(58) Field of Classification Search ................ 710/5, 15, 710/17, 18, 19, 29, 31, 32, 36, 38, 39, 40, 710/48, 200, 240, 241, 242
See application file for complete search history.

(56) References Cited

U.S. PATENT DOCUMENTS

| | | | |
|---|---|---|---|
| 5,873,085 A * | 2/1999 | Enoki et al. ............................ | 1/1 |
| 6,496,847 B1 | 12/2002 | Bugnion et al. | |
| 7,526,627 B2 * | 4/2009 | Harada ........................ | 711/202 |
| 7,890,669 B2 * | 2/2011 | Uehara et al. .................... | 710/22 |
| 2003/0212854 A1 * | 11/2003 | Kitamura et al. ............. | 711/112 |
| 2005/0193085 A1 * | 9/2005 | Shimizu ........................ | 709/216 |
| 2007/0143395 A1 | 6/2007 | Uehara et al. | |
| 2007/0186025 A1 * | 8/2007 | Boyd et al. ..................... | 710/305 |

OTHER PUBLICATIONS

Hitoshi Ueno et al., "Virtage for Blade Symphony, a Server Virtualization Feature which Improves Server Management Efficiency", Jul. 2007, in Japanese, pp. 52-57. The content of this document is described in Background of the Invention in the present application.
"I/O Virtualization and Sharing", Nov. 2006, Microsoft, pp. 1-13. http://www.pcisig.com/develoeprs/main/training_materials/.
Christopher Clark et al., "Live Migration of Virtual Machines", May 2005; NSDI $2^{nd}$ Symposium of Networked Systems Design & Implementation, pp. 273-286.

* cited by examiner

*Primary Examiner* — Tariq Hafiz
*Assistant Examiner* — Jasjit Vidwan
(74) *Attorney, Agent, or Firm* — Stites & Harbison PLLC; Juan Carlos A. Marquez, Esq.

(57) ABSTRACT

The physical server includes a hypervisor for managing an association between the virtual server and the I/O device allocated to the virtual server. The I/O switch includes: a setting register for retaining a request to inhibit a transaction from being issued from the I/O device to the virtual server; a Tx inhibition control module for performing an inhibition of the transaction from the I/O device to the virtual server, and guaranteeing a completion of a transaction from the I/O device issued before the inhibition; a virtualization assist module for converting an address of the virtual server into an address within a memory of the physical server; and a switch management module for managing a configuration of the I/O switch.

16 Claims, 11 Drawing Sheets

I/O DEVICE MANAGEMENT TABLE 117a

| VIRTUAL SERVER IDENTIFIER | I/O DEVICE IDENTIFIER |
|---|---|
| 1 | 10012 |
| 2 | 10011 |
| 2 | 11012 |
| ... | ... |

METHOD FOR SWITCHING I/O PATH IN A COMPUTER SYSTEM HAVING AN I/O SWITCH

CLAIM OF PRIORITY

The present application claims priority from Japanese application JP2008-20923 filed on Jan. 31, 2008, the content of which is hereby incorporated by reference into this application.

BACKGROUND OF THE INVENTION

This invention relates to an information processing system in which a server computer is connected with an I/O device through a PCI switch, in particular, a technique for virtualizing a server computer and migrating the virtualized server to another physical computer.

In recent years, against a backdrop of an increase in operation management costs due to an increase in the number of servers constituting an IT system and a performance boost for a physical server (physical computer) owing to a CPU multi-core and the like, attention is being given to a technique of server integration for reducing the number of physical servers by using a server virtualization technique for logically dividing one physical server into virtual servers to be operated.

There are several implementation methods for the above-mentioned server virtualization technique, among which a virtualization method using a hypervisor is known as being characterized in that overhead involved in virtualization is small (see, for example, 'Virtage' for 'BladeSymphony,' a Server Virtualization Feature which Improves Server Management Efficiency". July, 2007). The server virtualization method disclosed therein includes a hypervisor implemented as firmware for the physical server, and a virtualization assist function implemented as hardware. The hypervisor controls each of virtual servers (virtual computers) on the physical server, and the virtualization assist function converts an address for memory access made by the I/O device. In the server virtualization method disclosed in 'Virtage' for 'BladeSymphony,' a Server Virtualization Feature which Improves Server Management Efficiency", the hypervisor allocates an I/O device directly to the virtual server, and hence, the physical server and the virtual server can use the same OS environment. In addition, the hardware-based virtualization assist function performs an address conversion processing for the I/O device, and hence overhead on the address conversion processing involved in an I/O processing can be reduced, thereby improving I/O throughput.

On the other hand, a further performance boost for the physical server owing to the CPU multi-core and the like requires I/O throughput correspondent to performance of the physical server. Promising as a technique for improving the I/O throughput correspondent to the performance of the physical server is a PCI switch that can connect a plurality of I/O devices with respect to a plurality of physical servers.

Further, progress is being made toward standardization of an I/O virtualization technique for providing flexibility to an association between the virtual server and the I/O device by combining the above-mentioned server virtualization technique with the PCI switch (SR/MR-IoV (see Michael Krause, et al. "I/O Virtualization and Sharing". November, 2006)).

Against such a backdrop, an information processing system in which the server virtualization technique is combined with the PCI switch is regarded as becoming mainstream in the future.

Incidentally, a live migration is one of functions that enhance flexibility and availability of a computer system to which the server virtualization technique is applied (see Christopher Clerk, et al. "Live Migration of Virtual Machines". May, 2005, NSDI (Networked Systems Design and Implementation)'05).

The live migration is a function for migrating a running virtual server to another physical server. The live migration makes it possible to change a layout of running virtual servers depending on loads on the physical server and save a running virtual server from the physical server that needs maintenance. As a result, it is possible to enhance the flexibility and the availability of the system.

In a case where the live migration is realized in the above-mentioned information processing system in which the server virtualization technique is combined with the PCI switch, it is necessary to retain and take over three states of the running virtual server. The three states are an (a) CPU running state, a (b) memory content, and a (c) I/O device state. The (a) CPU running state can be retained when the hypervisor stops an operation of the virtual server.

However, a general hypervisor cannot stop memory access such as DMA made by the I/O device allocated to the virtual server or a processing for a transaction originated from an external I/O device, and therefore cannot retain the (b) memory content or the (c) I/O device state. Accordingly, in a case where the live migration is realized in the above-mentioned server virtualization technique, it is necessary to eliminate an influence of the running I/O device and retain the (b) memory content and the (c) I/O device state.

There exist several techniques for retaining those states.

Examples thereof include a method disclosed in US 2007/0186025 for a system having physical servers and I/O devices connected with each other through the PCI switch and managed by a PCI manager, in which in order to realize a migration of a virtual I/O device, a processing of a transaction from the I/O device during the migration is stopped.

In US 2007/0186025, the I/O device has a migration bit in its configuration space, and references the migration bit to judge whether or not a migration of the virtual I/O device is being performed.

If the migration is being performed, the I/O device stops its own processing, and inhibits an issuance of a transaction originated from the I/O device and bound for a memory. In addition, if the migration is being performed, the PCI manager saves the transaction within the PCI switch, which is originated from the I/O device and bound for the memory, to a specific storage area, and after the migration is completed, the transaction saved to the storage area is restored.

This prevents the transaction originated from the I/O device and being processed during the migration from rewriting the memory content, and prevents the I/O device state from being changed.

Meanwhile, U.S. Pat. No. 6,496,847 discloses a method in which a virtual server is provided with a device emulator obtained by a host OS emulating an I/O device, and a guest OS on the virtual server uses the device emulator to indirectly access the I/O device.

The host OS recognizes whether or not a migration is being performed, and if the migration is being performed, a processing of the device emulator is stopped to thereby allow the memory content and the I/O device state of the virtual server being migrated to be retained.

SUMMARY OF THE INVENTION

However, the method disclosed in US 2007/0186025 can be applied only in a case where the I/O device has a function of judging whether or not the migration of the virtual server is being performed. This raises a problem that a general-purpose I/O card widespread for use on a PC or the like cannot be targeted.

Further, in the method disclosed in U.S. Pat. No. 6,496,847, the virtual server accesses the I/O device, making it necessary to switch between the guest OS and the host OS, which raises a problem that the switching becomes overhead and lowers the processing performance. There is also a problem that the method using the device emulator cannot be applied in a case where the I/O device is allocated directly to the virtual server.

In order to solve the above-mentioned problems, in the information processing system in which the physical servers are connected with the I/O devices through the PCI switch, even if a general-purpose I/O device is allocated directly to the virtual server, it is necessary to reduce processing overhead while retaining the memory content and the I/O device state of the virtual server during the migration thereof.

It is therefore an object of this invention to provide a mechanism for reducing processing overhead while retaining a memory content and an I/O device state of a virtual server during a migration thereof even if a general-purpose I/O device is allocated directly to the virtual server.

According to an exemplary embodiment of this invention, in an information processing system including an I/O switch for connecting a plurality of physical servers with one or more I/O devices, the physical server includes a virtualization module for managing an association between the virtual server and the I/O device allocated to the virtual server.

The I/O switch includes: a register for retaining a request to inhibit a transaction from being issued from the I/O device to the virtual server; a transaction inhibition control module for performing an inhibition of the transaction from the I/O device to the virtual server, and guaranteeing a completion of a transaction from the I/O device issued before the inhibition; a virtualization assist module for converting an address of the virtual server into an address within a memory of the physical server; and a switch management module for managing a configuration of the I/O switch.

The virtualization module includes: a transaction instruction module for setting a transaction inhibition request (inhibition instruction information) and a memory address of the virtual server with respect to the register of the I/O switch; and a configuration change instruction module for instructing, upon reception of a completion notification from the I/O switch, the switch management module to change a configuration and the virtualization assist module to change an address conversion section.

The transaction instruction module is configured to perform the inhibition of the transaction from the I/O device to the virtual server and a processing of guaranteeing the completion of the transaction from the I/O device issued before the inhibition, and prevent the transaction from the I/O device from rewriting a memory state of the virtual server. Further, the configuration change instruction module is configured to update the address conversion section of the virtualization assist module to maintain an I/O device state so that a memory address for DMA or the like retained by the I/O device remains effective even after the virtual server is migrated.

Therefore, according to this invention, it is possible to reduce the processing overhead while retaining the memory content and the I/O device state of the virtual server during the migration thereof even if the general-purpose I/O device is allocated directly to the virtual server. This makes it possible to smoothly migrate the virtual computer to another physical computer through the I/O switch such as a PCI switch with the general-purpose I/O device being allocated to the virtual computer.

DETAILED DESCRIPTION OF THE PREFERRED EMBODIMENTS

Hereinafter, description will be made of an embodiment of this invention based on the attached drawings.

Figure 1:
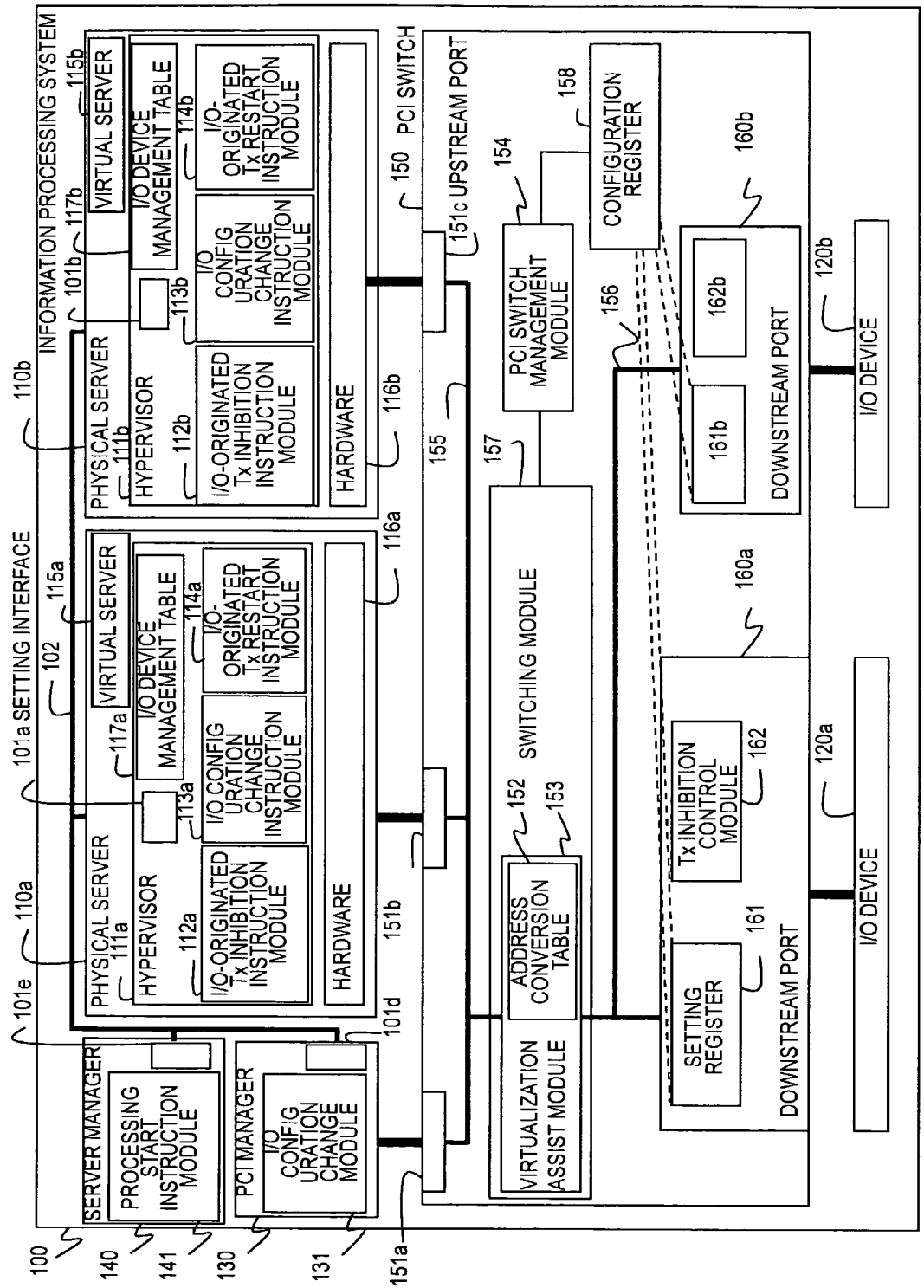
FIG. 1 is a block diagram showing an example of a configuration of an information processing system for executing a virtual server according to a first embodiment of this invention.

FIG. 1 is a block diagram showing an example of a configuration of an information processing system 100 having a mechanism for retaining a virtual server state according to a first embodiment of this invention.

The information processing system 100 includes one or more physical servers 110a and 110b, one or more I/O devices 120a and 120b, a server manager 140 for controlling a virtual server on the physical server, a PCI switch 150 for connecting the I/O devices 120a and 120b with the physical servers 110a and 110b, and a PCI manager 130 for managing the PCI switch 150. The physical servers 110a and 110b, the PCI manager 130, and the I/O devices 120a and 120b are connected with one another through the PCI switch 150. Further, the physical servers 110a and 110b, the PCI manager 130, and the server manager 140 are connected with one another through a management-purpose network 102 such as an Ethernet or an inter-integrated circuit (I2C). Alternatively, there may be provided a mechanism in which access is made in an inbound manner through the PCI switch 150. Any connection method may be employed as long as the physical servers 110a and 110b, the PCI manager 130, and the server manager 140 can exchange information with one another. Further, the first embodiment of this invention shows an example where the two physical servers and the two I/O devices are connected to the PCI switch, but the numbers of the components are not limited thereto.

The physical server 110a includes hardware 116a and a hypervisor 111a, and a virtual server 115a is operating on the physical server 110a.

The hardware 116a includes a CPU (processor), a chipset, and a memory which constitute hardware resources on the physical server. A physical connection configuration of the hardware 116a will be described later by referring to FIG. 3. It should be noted that the PCI manager 130 and the server manager 140 are also computers including a CPU, a chipset, and a memory in the same manner as the hardware 116a of the physical server 110a.

The hypervisor 111a is firmware or an application implemented on the physical server 110a, and manages the virtual server 115a on the physical server 110a. The virtual server 115a is allocated with resources including the CPU and the memory of the hardware 116a managed by the hypervisor 111a. To allocate CPU resources to the virtual server 115a, the hypervisor 111a retains a CPU scheduler (not shown) for managing an allocation of the CPU resources to the virtual server 115a. The CPU scheduler may be selected from well-known techniques and publicly-known techniques, and detailed description thereof will be omitted from the embodiment of this invention.

In the first embodiment of this invention, only one virtual server 115a is described, but the number of virtual servers is not limited to one. The hypervisor 111a generates a virtual server as necessary.

The hypervisor 111a includes an I/O device management table 117a, an I/O-originated transaction (Tx) inhibition instruction module 112a, an I/O configuration change instruction module 113a, an I/O-originated Tx restart instruction module 114a, and a setting interface 101a.

The I/O device management table 117a manages associations between the virtual server 115a and the I/O devices 120a and 120b allocated to the virtual server 115a. A structure of the I/O device management table 117a will be described later by referring to FIG. 2.

The I/O-originated Tx inhibition instruction module 112a instructs the PCI switch 150 to inhibit a transaction issued by the I/O devices 120a and 120b allocated to the virtual server 115a. For example, the I/O-originated Tx inhibition instruction module 112a issues a write transaction to a setting register 161 provided to a configuration register 158 of the PCI switch 150.

The I/O configuration change instruction module 113a instructs the PCI manager 130 to change a configuration of the PCI switch 150. In addition, the I/O configuration change instruction module 113a instructs a virtualization assist module 153 of the PCI switch 150 to change an address conversion table 152.

The I/O-originated Tx restart instruction module 114a instructs the PCI switch 150 to issue the transactions (I/O-originated transactions) originated from the I/O devices 120a and 120b allocated to the virtual server 115a. Specifically, the write transaction is issued to the setting register 161 provided to the PCI switch 150.

The setting interface 101a is an interface for exchanging setting information among the server manager 140, the PCI manager 130, and the hypervisor 111a. The setting information may be exchanged by using a general network, or a register for sharing information may be provided to the hypervisor 111a to exchange the information through register access. Examples of the information to be exchanged include information serving as a trigger for changing an I/O configuration.

The physical server 110a is configured as described above, and the physical server 110b also includes a hypervisor 111b, a virtual server 115b, and hardware 116b that are configured in the same manner as the physical server 110a.

The I/O devices 120a and 120b are general-purpose I/O interface cards such as NICs or HBAs of a fibre channel.

The PCI manager 130 is a computer including a management program for managing the PCI switch 150. The PCI manager 130 is implemented on hardware including a CPU and a memory. The PCI manager 130 includes an I/O configuration change module 131 for changing the configuration of the PCI switch 150 and a setting interface 101d for exchanging the setting information among the hypervisors 111a and 111b and the server manager 140. Further, the first embodiment of this invention shows only a single PCI manager 130, but a plurality of PCI managers may be provided for further improved reliability. In that case, information is controlled to maintain consistency among the plurality of PCI managers.

The server manager 140 is a computer including a program for managing the entirety of the information processing system 100, and is implemented on hardware including a CPU and a memory. The server manager 140 includes a processing start instruction module 141 for instructing start of a processing for a migration of the virtual server 115a (or 115b) and a setting interface 101e for exchanging the setting information among the hypervisors 111a and 111b and the PCI manager 130. The first embodiment of this invention shows only a single server manager 140, but a plurality of server managers may be provided for further improved reliability. In that case, information is controlled to maintain consistency among the plurality of server managers.

The PCI switch 150 is a switch fabric for connecting the plurality of physical servers 110a and 110b with the plurality of I/O devices 120a and 120b, and allows the physical servers 110a and 110b and the I/O devices 120a and 120b to transmit/receive a transaction to/from each other. The transaction will be described in detail later by referring to FIG. 10.

The information processing system 100 described in the first embodiment of this invention has only a single PCI switch 150, but a plurality of PCI switches may be provided. The plurality of PCI switches may be managed by different PCI managers, or may be managed by a single PCI manager. In addition, in the first embodiment of this invention, the PCI switch 150 is set as a switch fabric targeted to a PCI-Express protocol. However, the PCI switch 150 may be a switch fabric (I/O switch) targeted to another protocol such as a PCI protocol or a PCI-X protocol.

The PCI switch 150 includes one or more upstream ports 151a to 151c, one or more downstream ports 160a and 160b, a switching module 157, a PCI switch management module 154, and the configuration register 158 for storing the setting register 161, a routing table, and the like. The switching module 157 includes the virtualization assist module 153. The first embodiment of this invention shows the three upstream ports and the two downstream ports, but the numbers of those ports are not limited to those numbers.

The upstream ports 151a to 151c are ports for connection with the PCI manager 130 and the physical servers 110a and 110b, respectively.

The downstream ports 160a and 160b are ports for connection with the I/O devices 120a and 120b, respectively. The downstream port 160a includes a Tx inhibition control module 162 and the setting register 161. The Tx inhibition control module 162 uses information set in the setting register 161 to inhibit and restart the transaction issued from the I/O devices 120a and 120b allocated to the virtual servers 115a and 115b. The setting register 161 retains an inhibition instruction request issued from the I/O-originated Tx inhibition instruction module 112a of the hypervisor 111a. The downstream port 160a will be described in detail later by referring to FIG. 5.

The PCI switch management module 154 is a functional component for controlling the switching module 157 of the PCI switch 150, and operates in cooperation with the PCI manager 130. The PCI switch management module 154 divides the PCI switch 150 into one or a plurality of PCI trees for management thereof. The PCI tree includes a pair of one upstream port and one or a plurality of downstream ports. The PCI switch management module 154 routes a transaction between the upstream port and the downstream port so that some of the physical servers 110a and 110b and the I/O devices 120a and 120b that are connected to ports included in the given PCI tree cannot access the other physical servers and the I/O devices that are not connected to the ports of the PCI tree. If there exist a plurality of PCI trees, the PCI switch management module 154 uses a PCI tree identifier to uniquely identify each of the PCI trees. In addition, according to an instruction from the I/O configuration change module 131 of the PCI manager 130, the PCI switch management module 154 rewrites the configuration register 158 of the PCI switch 150, and changes the settings of the upstream port and the downstream port which belong to the PCI tree.

Based on a tree structure managed by the PCI switch management module 154, the switching module 157 transfers a transaction between the upstream port and the downstream port.

The virtualization assist module 153 is a control circuit located between paths 155 and 156 (in the switching module 157) that connect the upstream ports 151a to 151c with one another and the downstream ports 160a and 160b with each other, respectively, and includes the address conversion table 152. The address conversion table 152 is a table for managing an association between addresses (virtual addresses) of the virtual servers 115a and 115b and addresses (physical addresses) of the physical servers 110a and 110b. The address conversion table 152 will be described in detail later by referring to FIG. 4. The virtualization assist module 153 references the address conversion table 152 to convert the addresses for transactions issued from the I/O devices 120a and 120b to the virtual servers 110a and 110b, and issues the transactions to the memories of the physical servers 110a and 110b. In addition, the virtualization assist module 153 operates in cooperation with the hypervisors 111a and 111b, sets the associations between the virtual addresses and the physical addresses set in the address conversion table 152, and changes the associations as necessary. The first embodiment of this invention shows the virtualization assist module 153 as a single control component, but a plurality of virtualization assist modules 153 may be distributively provided to the upstream ports and the downstream ports.

Figures 2, 3:
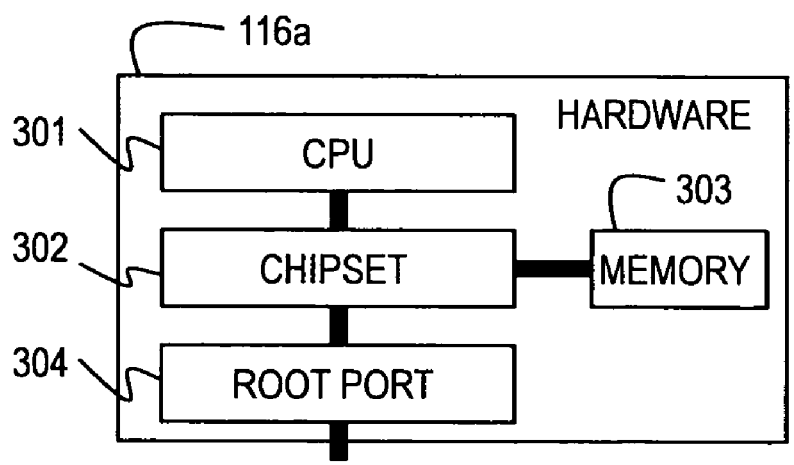
FIG. 2 is an explanatory diagram showing an example of an I/O device management table according to the first embodiment.
FIG. 3 is a block diagram showing a hardware configuration of a physical server according to the first embodiment.

FIG. 3 is a block diagram showing a configuration of the hardware 116a of the physical server 110a. The hardware 116a includes a CPU 301, a chipset 302, a memory 303, and a root port 304. The CPU 301 is a processor for executing a program. The CPU 301 accesses the register of the PCI switch 150 through a memory mapped I/O (MMI/O) obtained by mapping the register of the PCI switch 150 in a portion of a memory address area. In addition, the CPU 301 and the chipset 302 support a processing for a CPU-originated Tx inhibition request (quiescence request) and a CPU-originated Tx inhibition canceling request (dequiesce request), and can perform an inhibition of a transaction originated from the CPU 301 and a cancellation of the inhibition. Further, the chipset 302 connects the CPU 301, the memory 303, and the root port 304 with one another. The memory 303 provides a main memory area of the physical server 110a, and has a portion of its area used as a memory area for the virtual server 115a. The root port 304 is connected to the upstream port 151b of the PCI switch 150, serving as a root of the PCI tree to which the physical server 110a is connected.

Figure 10:
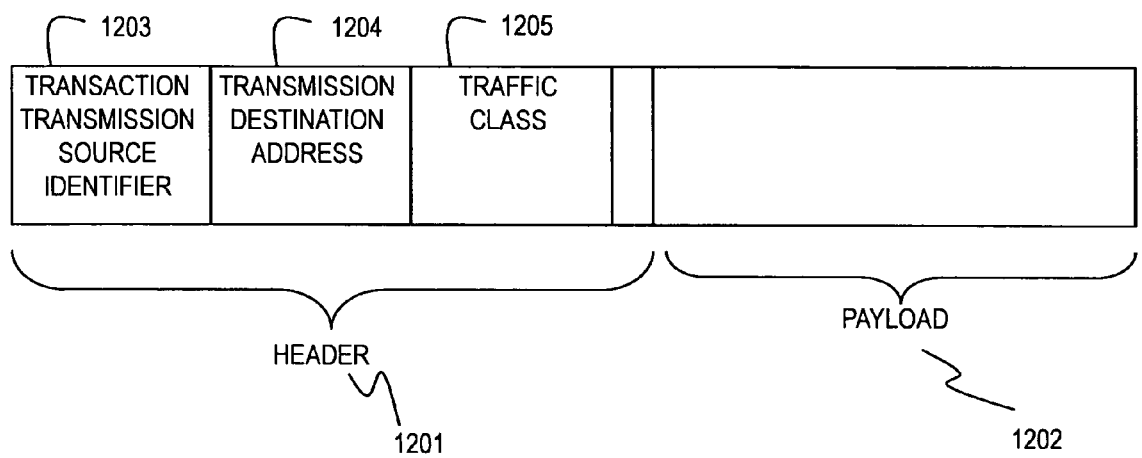
FIG. 10 is a block diagram showing a structure of a transaction according to the first embodiment.

FIG. 10 is a block diagram showing a structure of a transaction transmitted/received between the physical servers 110a and 110b and the I/O devices 120a and 120b. The transaction is a packet including a header 1201 and a payload 1202.

The header 1201 is information necessary for the PCI switch 150 to route the transaction, and includes a transaction transmission source identifier 1203 (requester ID), a transmission destination address 1204, and a traffic class 1205. Further, if there are a plurality of PCI trees, the PCI tree identifier is added to the header 1201. Header information is determined according to standardization specifications, and therefore, detailed description thereof will be omitted from the embodiment of this invention. Herein, description will be made only of the header information related to this invention.

The transaction transmission source identifier 1203 is an identifier including a device number, a function number, and a bus number within the PCI tree, of a transmission source I/O device or root port, and can uniquely identify the downstream port connected to the transmission source I/O device or the upstream port connected to the root port.

The transmission destination address 1204 is an address of a memory area to which the transaction is transmitted. The traffic class 1205 is information for uniquely identifying a virtual channel within the PCI switch 150 through which the transaction passes. In the embodiment of this invention, the traffic class can be set to a value varying from 0 through 7.

Data retained in the transaction is stored in the payload 1202. For example, in a case of a memory write transaction, data to be written to a memory is stored in the payload 1202.

FIG. 2 is an explanatory diagram showing an example of the I/O device management table 117a. It should be noted that an I/O device management table 117b of the physical server 110b is configured in the same manner.

The I/O device management table 117a is managed by the hypervisor 111a, and includes a virtual server identifier 201 and an I/O device identifier 202. The virtual server identifier 201 is a number for uniquely identifying the virtual server 115a within the physical server 110a that retains the I/O device management table 117a. The I/O device identifier 202 is an identifier for uniquely identifying the I/O device allocated to the physical server 110a. In the first embodiment of this invention, the transaction transmission source identifier 1203 shown in FIG. 10 is used as the I/O device identifier 202. The transaction transmission source identifier 1203 is included in the header 1201 of the transaction, and can uniquely identify the downstream port to which the I/O device is connected. However, any other identifier may be used as long as the identifier is included in the transaction and can uniquely identify the downstream port to which the I/O device is connected.

Figures 4, 5:
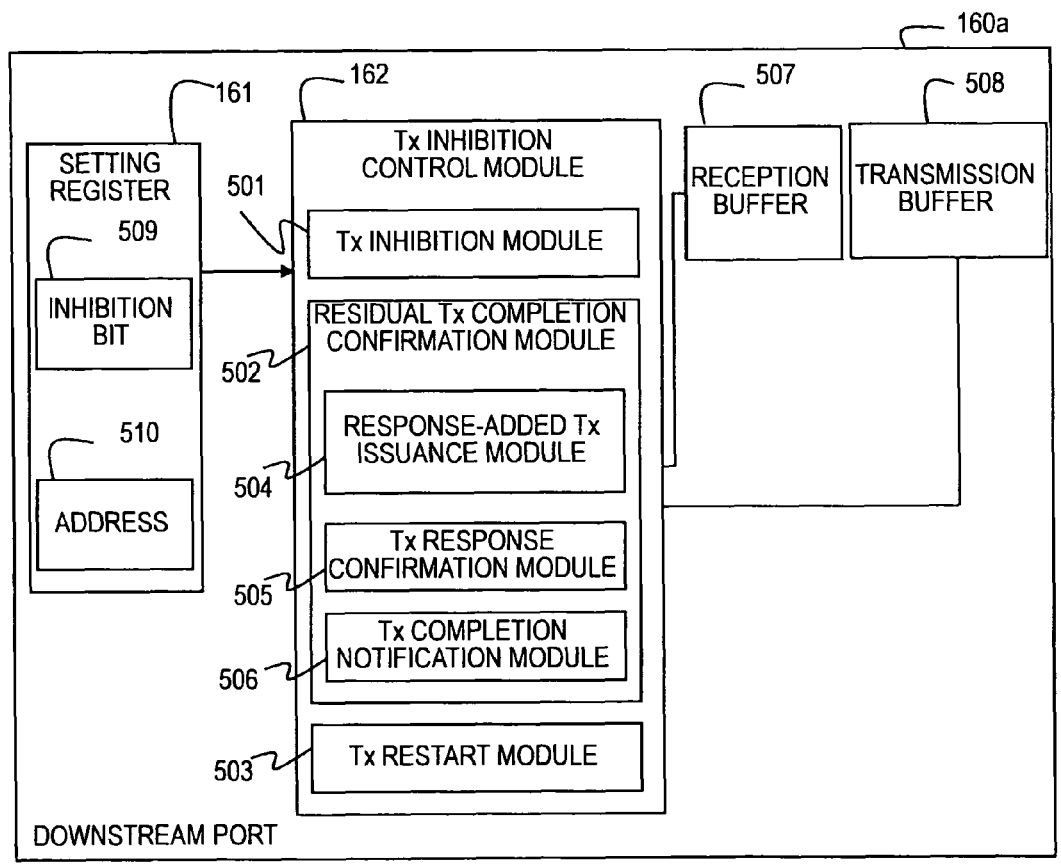
FIG. 4 is an explanatory diagram showing an example of an address conversion table according to the first embodiment.
FIG. 5 is a block diagram showing a configuration of a downstream port according to the first embodiment.

FIG. 4 is an explanatory diagram showing the address conversion table 152 in detail. The address conversion table 152 is managed for each PCI tree, and retains a pair of an I/O device identifier 401 and a conversion offset 402. The transaction transmission source identifier 1203 included in the header of an I/O-originated transaction is used as the I/O device identifier 401, and the I/O device identifier 401 can uniquely identify the I/O device within the PCI tree. The conversion offset 402 represents a start address of the memory area for the virtual server 115*a* through which the I/O device is allocated, within the memory area of the physical server 110*a*.

The virtualization assist module 153 references the address conversion table 152 to obtain the conversion offset 402 corresponding to the transaction transmission source identifier 1203 included in the I/O-originated transaction, and uses the conversion offset 402 to convert the transmission destination address 1204 of the I/O-originated transaction from the virtual address into the physical address. In the first embodiment of this invention, the address conversion table 152 is managed by being divided on a PCI tree basis, but the plurality of PCI trees may be collectively managed by one address conversion table.

FIG. 5 is a block diagram showing a configuration of the downstream port 160*a*. The downstream port 160*a* includes the setting register 161, the Tx inhibition control module 162, a reception buffer 507 for transmitting the transaction received from the I/O device connected to the downstream port 160*a* to the upstream port, and a transmission buffer 508 for transmitting the transaction received from the upstream port to the I/O device connected to the downstream port 160*a*, and allows the transaction to be transmitted/received between the I/O devices 120*a* and 120*b* and the physical server 110*a*.

Figure 11:
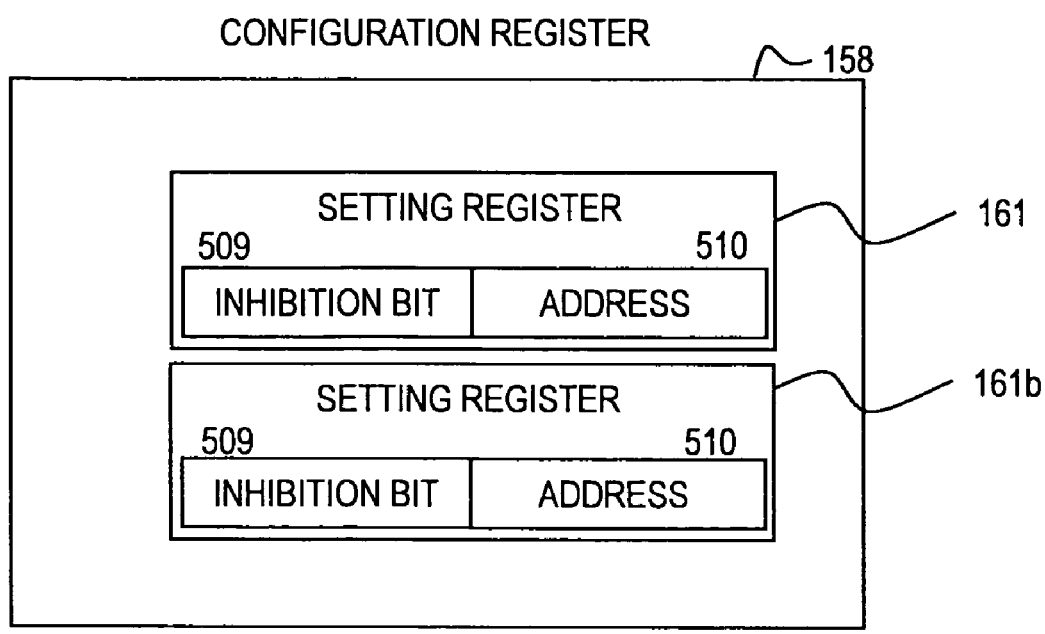
FIG. 11 is a block diagram showing setting registers set in a configuration register according to the first embodiment.

FIG. 11 is a block diagram showing setting registers set in the configuration register 158. As shown in FIG. 11, the setting register 161 is provided in the configuration register 158 of the PCI switch 150, and is provided for each of the downstream ports 160*a* and 160*b*. The setting register 161 corresponds to the downstream port 160*a*, while the setting register 161*b* corresponds to the downstream port 160*b*. Each of the setting registers 161 and 161*b* is a register that can be accessed by the physical servers 110*a* and 110*b* and the PCI manager 130 through the MMI/O, and includes fields for storing an inhibition bit 509 and an address 510 for each downstream port. The inhibition bit 509 is set and canceled according to instructions from the I/O-originated Tx inhibition instruction module 112*a* and the I/O-originated Tx restart instruction module 114*a*, respectively, of the hypervisor 111*a*. In the first embodiment of this invention, a transaction for performing writing with respect to a configuration space of PCI is used. For example, the I/O-originated Tx inhibition instruction module 112*a* uses the write transaction with respect to the configuration space to set the inhibition bit 509 to "1", and the I/O-originated Tx restart instruction module 114*a* uses the write transaction with respect to the configuration space to clear a value of the inhibition bit 509 into "0". The virtual address of the virtual server to be migrated is set as the address 510 of the setting register 161 according to the instruction from the I/O-originated Tx inhibition instruction module 112*a*. Further, the I/O-originated Tx restart instruction module 114*a* uses the write transaction with respect to the configuration space to clear a value of the address 510.

The Tx inhibition control module 162 includes a Tx inhibition module 501, a residual Tx completion confirmation module 502, and a Tx restart module 503.

The Tx inhibition module 501 controls to prevent the I/O-originated transaction within the reception buffer 507 from being issued to the upstream ports 151*a* to 151*c*. For example, by using a mechanism for flow control performed within the PCI switch 150 between the path 156 (switching module 157) and the reception buffer 507, the Tx inhibition module 501 controls not to return ACK (response) to the transaction issued from the reception buffer 507 to thereby inhibit the transaction from being issued from the reception buffer 507.

The residual Tx completion confirmation module 502 includes a response-added Tx issuance module 504, a Tx response confirmation module 505, and a Tx completion notification module 506, and guarantees a completion of the I/O-originated transaction issued before the inhibition.

The response-added Tx issuance module 504 generates a memory read transaction with the address 510 of the setting register 161 set as a transmission destination address, and issues the generated memory read transaction. The memory read transaction is one kind of response-added Tx.

The Tx response confirmation module 505 confirms that a response to the memory read transaction issued by the response-added Tx issuance module 504 has been received. In the first embodiment of this invention, the Tx response confirmation module 505 monitors the transmission buffer 508, and confirms that the transmission buffer 508 has received the response to the memory read transaction issued by the response-added Tx issuance module 504.

In response to the fact that the Tx response confirmation module 505 has confirmed the response, the Tx completion notification module 506 transmits a notification of a completion of Tx inhibition control to the hypervisor 111*a* of the physical server allocated to the I/O device connected to the downstream port 160*a*.

When detecting that the inhibition bit 509 of the setting register 161 has been cleared, the Tx restart module 503 restarts an issuance of the I/O-originated transaction within the reception buffer 507. For example, the Tx restart module 503 cancels the inhibition of ACK from being returned to the transaction issued from the reception buffer 507 to thereby cause the reception buffer 507 to restart the issuance of the transaction.

It should be noted that the downstream port 160*b* is configured in the same manner as the downstream port 160*a*, and includes the setting register 161*b* and a Tx inhibition control module 162*b*. Further, the upstream ports 151*a* to 151*c* connected to the computers may have any configuration as long as a transmission buffer and a reception buffer are included, and a setting register or a Tx inhibition control module may not necessarily be set.

Figure 6:
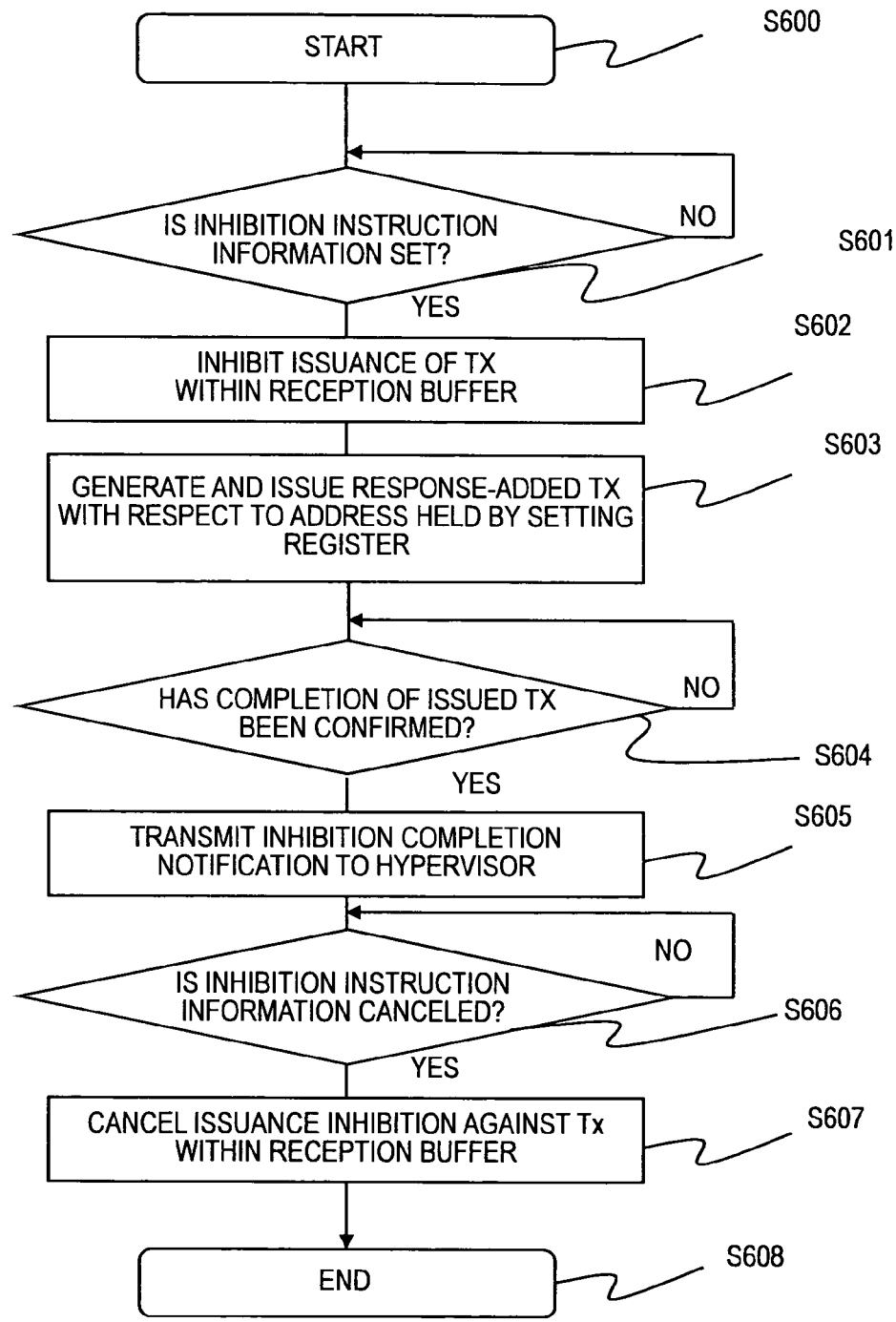
FIG. 6 is a flowchart showing an example of a processing performed by a Tx inhibition control module according to the first embodiment.
Figure 7:
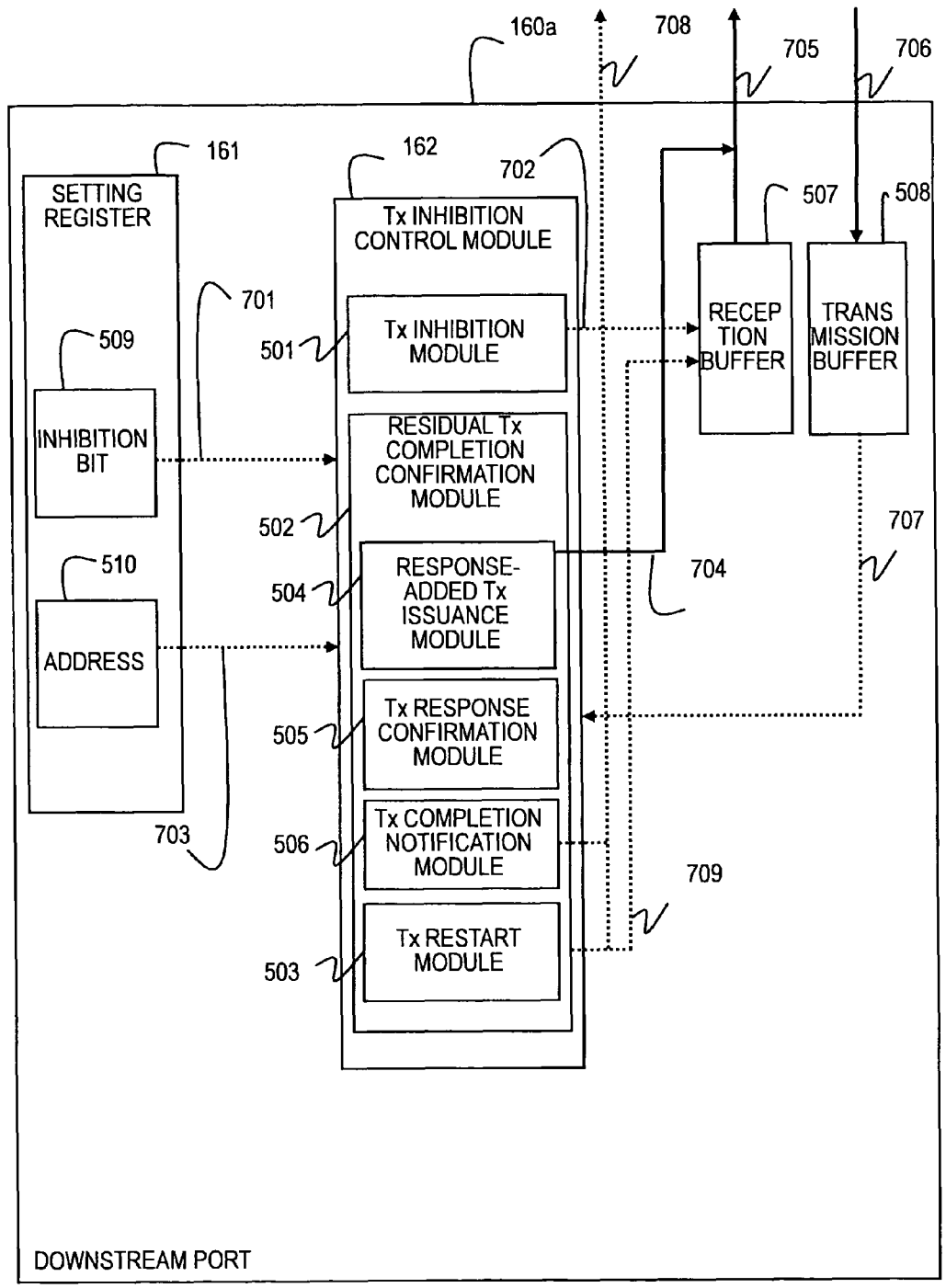
FIG. 7 is a block diagram showing a flow of a transaction involved in the processing performed by the Tx inhibition control module according to the first embodiment.

FIG. 6 is a flowchart showing an example of a processing performed by the Tx inhibition control module 162 (or 162*b*) described with reference to FIG. 5. In addition, FIG. 7 is a block diagram showing a flow of a transaction involved in the processing performed by the Tx inhibition control module 162. Hereinafter, by referring to FIGS. 6 and 7, description will be made of a flow of the processing performed by the Tx inhibition control module 162. It should be noted that the following description shows an example of a processing related to the downstream port 160*a*, but the downstream port 160*b* can perform the processing in the same manner.

The processing of FIGS. 6 and 7 is started in a case where the I/O device 120*a* is connected to the downstream port 160*a* (S600).

First, the Tx inhibition module 501 of the Tx inhibition control module 162 monitors the inhibition bit 509 of the setting register 161, and checks whether or not the inhibition bit 509 is set (S601). Specifically, the Tx inhibition control module 162 repeatedly reads the value of the inhibition bit 509 from the setting register 161 until it is detected that the inhibition bit 509 of the setting register 161 shifts from "0" to "1" (701 of FIG. 7). If the inhibition bit 509 is set to "1", the procedure advances to Step S602. If the inhibition bit 509 is set to "0", Step S601 is repeated.

Subsequently, the issuance of the transaction within the reception buffer 507 is inhibited (S602). Specifically, the Tx inhibition module 501 inhibits ACK (response) from being returned to the transaction issued to the upstream ports 151a to 151c from the reception buffer 507 (702 of FIG. 7).

Subsequently, to guarantee the completion of the I/O-originated transaction issued before inhibiting the transaction issuance in Step S602, the Tx inhibition module 501 generates and issues a response-added Tx with respect to the address 510 held by the setting register 161 (S603). In a case where there are the plurality of different paths between the I/O device and the physical server (I/O paths), the response-added transaction is issued to every I/O path. Specifically, the response-added Tx issuance module 504 of the residual Tx completion confirmation module 502 acquires the address 510 from the setting register 161 (703 of FIG. 7), generates a memory read transaction being one kind of response-added Tx with respect to the address (704 of FIG. 7), and issues the memory read transaction to the upstream port (705 of FIG. 7). In addition, in a case where the PCI switch 150 includes a plurality of virtual channels, in order to guarantee the completion of the I/O-originated transaction for all of virtual channels available within the PCI switch 150, the response-added Tx issuance module 504 issues eight different memory read transactions to which headers with the traffic classes set to "0" to "7" are added. By issuing the memory read transactions for all of the traffic classes, it is possible to guarantee the I/O-originated transaction for all of the available virtual channels.

Subsequently, the completion of the response-added transaction issued in Step S603 is confirmed (S604). According to an ordering rule of PCI-Express, the response-added transaction does not overtake the preceding memory write transaction, and hence, when the issued response-added transaction is completed, it is guaranteed that the I/O-originated memory write transaction issued before the inhibition has been completed. In other words, after the completion of the response-added transaction issued in Step S603 is confirmed, a memory content of the virtual server 115a is retained. Until the Tx response confirmation module 505 of the residual Tx completion confirmation module 502 confirms all of responses to the memory read transaction (706 of FIG. 7), Step S604 is repeated (707 of FIG. 7).

Subsequently, the Tx inhibition control module 162 transmits a transaction inhibition completion notification to the hypervisor 111a (S605). Specifically, the Tx completion notification module 506 of the residual Tx completion confirmation module 502 issues a processing completion notification 708 to the hypervisor 111a. The processing completion notification 708 may be issued by means of interruption with respect to the physical server 110a or writing with respect to the memory 303 of the physical server 110a.

Subsequently, the procedure waits until the inhibition instruction information of the I/O-originated transaction is canceled (S606). Specifically, the Tx restart module 503 checks whether or not the inhibition bit 509 of the setting register 161 is cleared into "0" (701 of FIG. 7), and if the inhibition bit 509 shifts to "0", the procedure advances to the next step.

Finally, the inhibition of the I/O-originated transaction within the reception buffer 507 is canceled (S607). Specifically, the Tx restart module 503 cancels the inhibition of ACK from being returned to the transaction issued by the reception buffer 507, to thereby restart the issuance of the transaction from the reception buffer 507 toward the upstream ports 151a to 151c (709 of FIG. 7).

After the above-mentioned flow of processing, the Tx inhibition control module 162 completes the processing (S608). As described above, the Tx inhibition control module 162 performs the inhibition of and completion guarantee for the I/O-originated transaction, thereby allowing protection of the memory content of the physical server 110a against the I/O-originated transaction. In other words, after starting the inhibition of the I/O-originated transaction, the response-added transaction is issued with respect to the address of the migration-source virtual server set as the address 510 of the setting register 161, and the completion of the issued response-added transaction is confirmed, which can guarantee that the transaction issued before the start of the inhibition has been completed.

Figure 8:
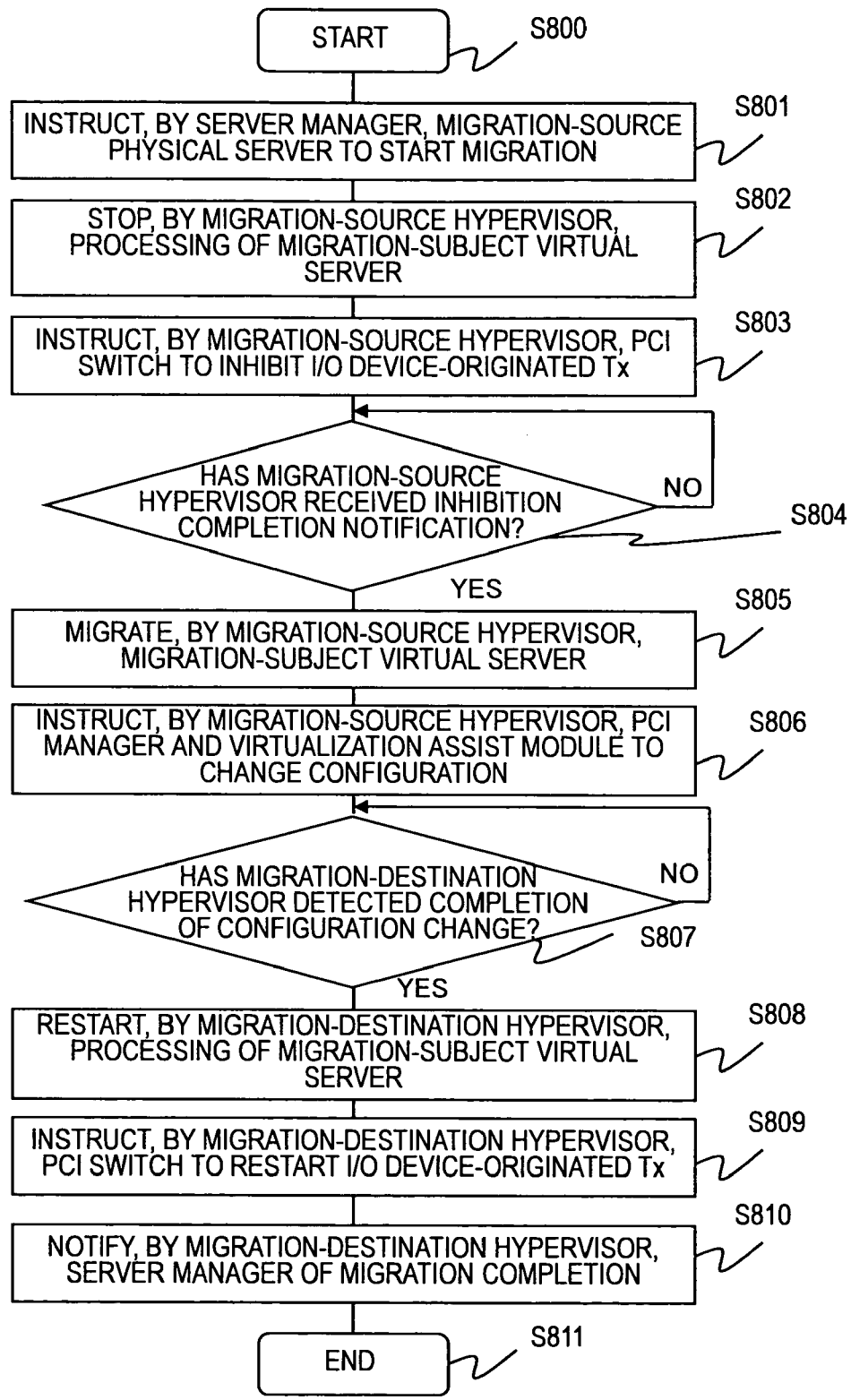
FIG. 8 is a flowchart showing an example of a live migration processing for the virtual server performed in the information processing system according to the first embodiment.
Figure 9:
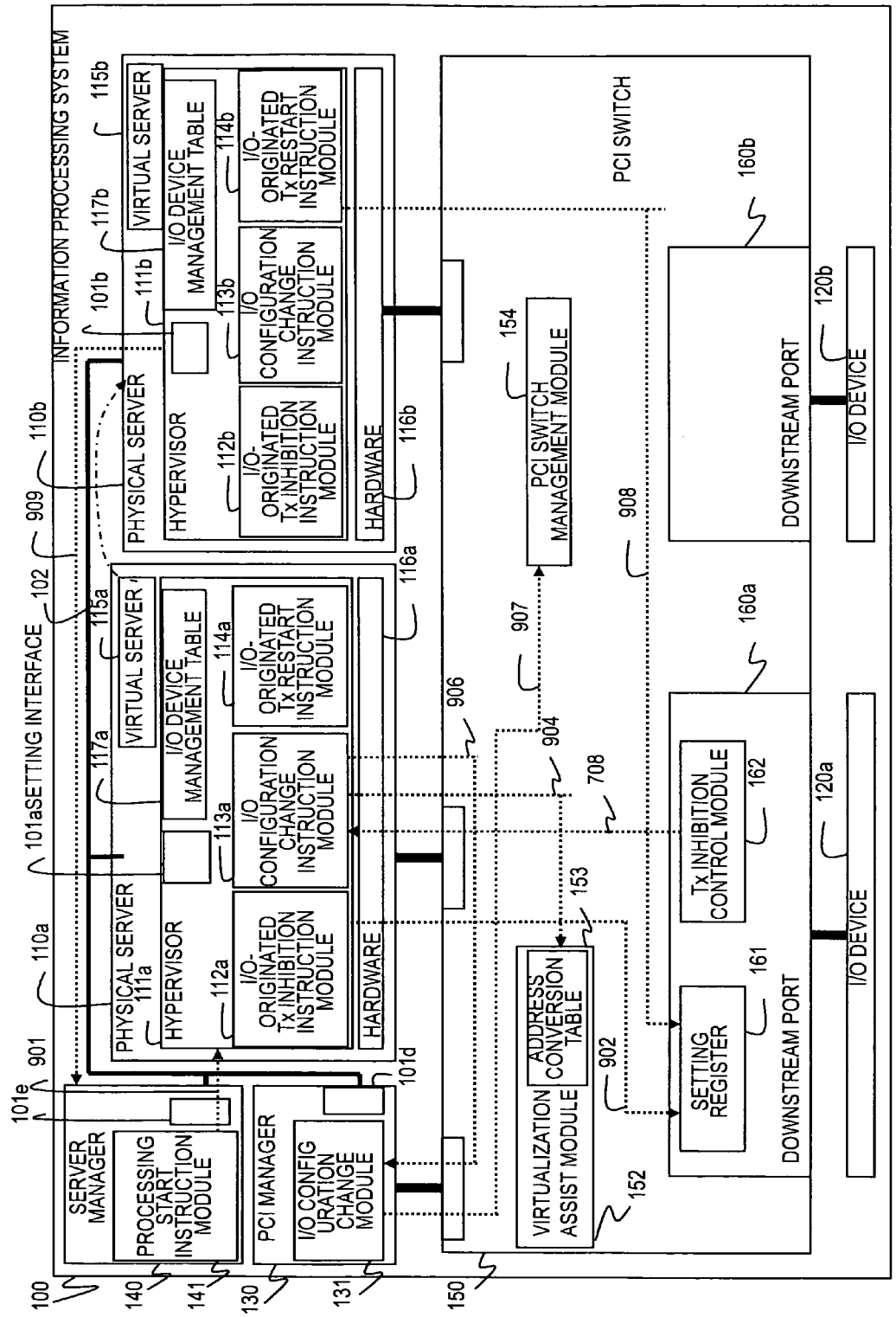
FIG. 9 is a block diagram showing a main portion of the information processing system and a flow of a transaction involved in the live migration processing according to the first embodiment.

FIG. 8 is a flowchart showing a live migration processing for realizing a live migration of the virtual server in the information processing system 100. In addition, FIG. 9 is a block diagram showing a main portion of the information processing system 100 and a flow of a transaction involved in the live migration processing.

The flowchart of FIG. 8 will be described on the assumption that the virtual server 115a to which the I/O device 120a is allocated is migrated from the physical server 110a to the physical server 110b.

The virtual server 115a to be a subject of a migration is called a migration-subject virtual server. The physical server 110a on which the migration-subject virtual server exists is called a migration-source physical server, and the hypervisor 111a on the migration-source physical server 110a is called a migration-source hypervisor. Further, the physical server 110b to be a destination of the migration is called a migration-destination physical server, and the hypervisor 111b on the migration-destination physical server 110b is called a migration-destination hypervisor.

The flowchart of FIG. 8 shows a processing flow after the processing start instruction module 141 of the server manager 140 issues a request to start a migration of the migration-subject virtual server 115a with respect to the migration-source hypervisor 111a until the migration-destination hypervisor 111b notifies the server manager 140 of a migration completion.

The live migration processing is started when the migration-source hypervisor 111a receives a migration start request 901 made by the processing start instruction module 141 of the server manager 140 (S801).

The migration start request 901 of FIG. 9 includes the virtual server identifier of the migration-source virtual server 115a and the identifier of the migration-destination physical server 110b. The migration-source hypervisor 111a performs the following processing in response to the migration start request 901.

First, the migration-source hypervisor 111a stops the processing of the migration-subject virtual server 115a (S802). In order to realize Step S802, well-known means is used. In the first embodiment of this invention, first, the migration-source hypervisor 111a transmits the CPU-originated Tx inhibition request to the CPU 301 and the chipset 302 of the hardware 116a. Then, the hypervisor 111a changes the settings of the CPU scheduler so that the CPU resources are not allocated to the virtual server 115a, and stops the operation of the virtual server 115a. Finally, the CPU-originated Tx inhibition canceling request is performed. The above-mentioned processing guarantees the stopping of the virtual server 115a and the completion of the transaction originated from the virtual server 115a.

Subsequently, the migration-source hypervisor 111a instructs the PCI switch 150 to inhibit the transaction from the I/O device 120a connected with the migration-subject virtual server 115a (S803). Specifically, the I/O-originated Tx inhibition instruction module 112a of the migration-source hypervisor 111a references the I/O device management table 117a to extract the I/O device 120a allocated to the virtual server 115a. Then, the I/O-originated Tx inhibition instruction module 112a performs writing on the configuration register 158 with respect to the setting register 161 of the downstream port 160a connected to the I/O device 120a through the MMI/O of the PCI switch 150 (902 of FIG. 9). Specifically, the inhibition bit 509 of the setting register 161 is set to "1", and a part of memory addresses used by the virtual server 115a is set as the address 510. This results in the start of the processing of inhibiting, by the Tx inhibition control module 162 of the downstream port 160a, the transaction from the I/O device 120a allocated to the virtual server 115a. The flow of the processing of inhibiting the transaction from the I/O device is the same as described above by referring to FIG. 6.

Subsequently, the migration-source hypervisor 111a waits for the inhibition completion notification for the transaction originated from the I/O device 120a to be transmitted from the Tx inhibition control module 162 of the PCI switch 150 (S804). If the migration-source hypervisor 111a receives the processing completion notification 708, it is possible to confirm that all of the transactions bound for the migration-subject virtual server 115a have been completed, and to guarantee that the memory content of the virtual server 115a is not rewritten by the I/O-originated transaction.

Subsequently, the migration-source hypervisor 111a migrates the migration-subject virtual server 115a from the migration-source physical server 110a to the migration-destination physical server 110b (S805). In order to realize Step S805, well-known means is used. Specifically, the hypervisor 111a copies an image of an OS and an application on the virtual server 115a to the migration-destination physical server 110b. In the first embodiment of this invention, the hypervisor 111a uses an outbound communication using the management-purpose network 102 to copy the memory content of the virtual server 115a and configuration information on the virtual server 115a held by the hypervisor 111a to the migration-destination physical server 110b. However, the virtual server may be migrated by an inbound communication through the PCI switch 150.

Subsequently, the migration-source hypervisor 111a instructs the takeover of the I/O device 120a allocated to the migration-subject virtual server 115a (S806). Specifically, the I/O configuration change instruction module 113a of the hypervisor 111a changes settings of the PCI switch management module 154, and changes the PCI tree to which the I/O device 120a is connected. In other words, the allocation of the I/O device 120a is switched over from the physical server 110a to the virtual server 115a on the physical server 110b. Further, the virtualization assist module 153 is accessed to change the association between the physical address and the virtual address in the address conversion table 152. In the change, the conversion offset 402 of an entry of the address conversion table 152 whose I/O device identifier 401 matches the I/O device 120a is updated to an offset value corresponding to the physical address of the memory of the physical server 110b, which is a migration destination of the virtual server 115a. In other words, the I/O configuration change instruction module 113a of the hypervisor 111a transmits a command with the I/O device identifier 401 and the conversion offset 402 of the new physical server 110b to the PCI switch management module 154. After that, the virtual server 115a is deleted from the physical server 110a, and hence, the hypervisor 111a deletes information related to the I/O device 120a from the I/O device management table 117a.

In order to change the settings of the PCI switch management module 154, well-known means is used. Specifically, the I/O configuration change instruction module 113a of the hypervisor 111a issues an I/O configuration change request 906 to the I/O configuration change module 131 of the PCI manager 130. The I/O configuration change request 906 is transmitted to the PCI manager 130 through the PCI switch 150 or the setting interface 101a and 101d. The I/O configuration change request 906 includes the identifier of the PCI switch 150 and the I/O device identifier of a takeover-subject I/O device. Further, in a case where a plurality of PCI trees are included within the PCI switch 150, the I/O configuration change request 906 includes the PCI tree identifier of a takeover-source PCI tree and the PCI tree identifier of a takeover-destination PCI tree. In response to the I/O configuration change request 906, the I/O configuration change module 131 issues a setting change request 907 to the PCI switch management module 154.

Further, in order to change the settings of the address conversion table 152, the I/O configuration change instruction module 113a issues an address conversion table update request 904 to the virtualization assist module 153. The address conversion table update request 904 includes the I/O device identifier and information on the conversion offset. In a case where a plurality of PCI trees are included within the PCI switch 150, the address conversion table update request 904 includes the PCI tree identifier. In response to the address conversion table update request 904, the virtualization assist module 153 updates the address conversion table 152.

By changing the settings of the PCI switch management module 154 and the settings of the virtualization assist module 153, the transaction existing in the reception buffer 507 of the downstream port 160a is written to a memory area allocated to the virtual server 115a on the migration-destination physical server 110b.

Subsequently, the migration-destination hypervisor 111b waits for a completion notification for the I/O configuration change (S807). The completion notification may be explicitly received by the hypervisor 111b from the I/O configuration change module 131 of the PCI manager 130, or the hypervisor 111b may detect through the shared register or the like that the I/O device 120a is added to the migration-destination physical server 110b. Any method may be employed as long as the hypervisor 111b can recognize that the I/O configuration change has been completed. Upon reception of the completion notification for the I/O configuration change, the hypervisor 111b adds information related to the I/O device 120a to the I/O device management table 117b.

Subsequently, the migration-destination hypervisor 111b restarts the processing of the migration-subject virtual server 115a (S808). In order to realize Step S808, well-known means is used. For example, the hypervisor 111b changes the settings of the CPU scheduler of the hypervisor 111b to allocate the CPU resources to the virtual server 115a, and restarts the operation of the virtual server 115a.

Subsequently, the migration-destination hypervisor 111b instructs the PCI switch 150 to restart the I/O-originated transaction (S809). Specifically, the I/O-originated Tx restart instruction module 114b of the hypervisor 111b references the I/O device management table 117b to extract the downstream port 160a to which the I/O device 120a allocated to the migration-subject virtual server 115a is connected. Then, the write transaction with respect to the configuration space is used to register-access the setting register 161 corresponding to the downstream port 160a (908 of FIG. 9). Upon the register access 908, the inhibition bit 509 and the address 510 of the setting register 161 are cleared into "0". The Tx restart module 503 of the downstream port 160a detects that various setting information within the setting register 161 have been cleared into "0", and restarts the transmission of the transaction from the I/O device 120a.

Finally, in Step 810, the migration-destination hypervisor 111b notifies the server manager 140 that the migration has been completed (909 of FIG. 9).

After the above-mentioned flow of processing, the live migration is completed (S811). As described above, by performing the live migration processing, it is possible to prevent the transaction from the I/O device 120a allocated to the migration-subject virtual server 115a from being written to the memory area of the virtual server during the migration. Therefore, it is possible to realize the retention of the memory state and the I/O device state of the virtual server 115a being the subject of the live migration.

Modified Example 1

The mechanism for retaining the states of the virtual server described in the first embodiment of this invention can be applied to an I/O path alternating function in addition to the live migration of the virtual server. The I/O path alternating function is a function of providing a plurality of active-system and standby-system paths (I/O paths) between physical servers and I/O devices allocated to the physical servers and failing the active-system I/O path over to the standby-system I/O path when a failure occurs in a port or the like along the I/O path. The I/O path alternating function can avoid system down of the information processing system due to the failure in the port of the PCI switch, thereby improving availability of the information processing system.

Figure 12:
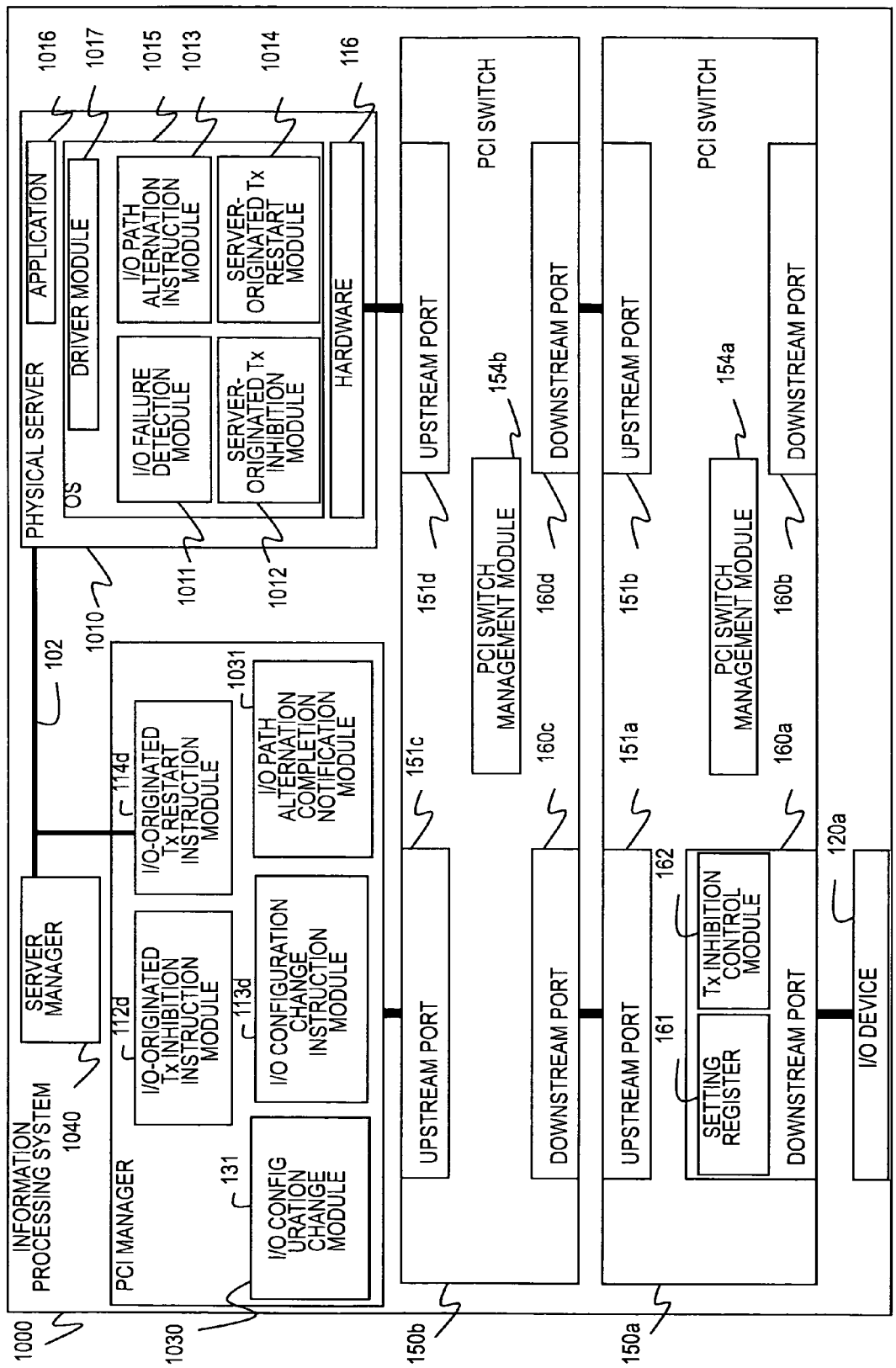
FIG. 12 is a block diagram showing a configuration of an information processing system having an I/O path alternating function according to Modified Example 1 of this invention.

FIG. 12 is a block diagram showing a configuration of an information processing system 1000 having the I/O path alternating function according to Modified Example 1 of this invention.

The information processing system 1000 includes at least one physical server 1010, at least one I/O device 120a, a PCI manager 1030, a server manager 1040, and one or more PCI switches 150a and 150b. The physical server 1010, the PCI manager 1030, and the I/O device 120a are connected with one another through the PCI switches 150a and 150b. The PCI switches 150a and 150b are connected to each other through two paths passing through the upstream port 151a and a downstream port 160c and passing through the upstream port 151b and a downstream port 160d. In addition, the physical server 1010, the PCI manager 1030, and the server manager 1040 are connected with one another through the management-purpose network 102. It should be noted that as in the first embodiment, the PCI switches 150a and 150b include the configuration register and the switching module, which are omitted from FIG. 12. Further, the downstream ports 160a to 160d include the Tx inhibition control module 162 and the setting register 161 set in the configuration register, but the setting register and the like are omitted from FIG. 12 in terms of the downstream ports 160b to 160d.

The I/O device 120a is allocated to the physical server 1010, and an I/O path passing through the upstream port 151d, the downstream port 160d, the upstream port 151b, and the downstream port 160a is set as the active-system I/O path between the physical server 1010 and the I/O device 120a. In addition, an I/O path passing through the upstream port 151d, the downstream port 160c, the upstream port 151a, and the downstream port 160a is set as the standby-system I/O path.

The configuration of the components of the information processing system 1000 is similar to the configuration of the components of the information processing system 100 described in the first embodiment of this invention, and hence, hereinafter, description will be made only of differences between the information processing system 1000 and the information processing system 100.

The physical server 1010 includes a hardware 116 including a CPU, a chipset, and a memory. An OS 1015 runs on the physical server 1010, and an application 1016 runs on the OS 1015.

The OS 1015 includes a driver module 1017, an I/O failure detection module 1011, a server-originated Tx inhibition module 1012, an I/O path alternation instruction module 1013, and a server-originated Tx restart module 1014. The driver module 1017 is a driver for the I/O device 120a. The I/O failure detection module 1011, the server-originated Tx inhibition module 1012, the I/O path alternation instruction module 1013, and the server-originated Tx restart module 1014 are implemented as functions of the OS 1015, and hence, the application 1016 can perform the I/O path alternation processing without any particular concern.

The I/O failure detection module 1011 detects an I/O failure notification from the I/O device or the PCI switch used by the OS 1015, and if the failure relates to the I/O path, starts the I/O path alternation processing. Specifically, the I/O failure detection module 1011 analyzes the I/O failure notification received by an Advanced Error Reporting function provided to a PCI-Express switch, for example, and if the failure relates to the I/O path, starts the I/O path alternation processing without resetting the physical server 1010.

The server-originated Tx inhibition module 1012 inhibits the issuance of a transaction (server-originated transaction) bound for the I/O device using the I/O path in which the failure has occurred. In order to realize the inhibition, well-known means is used. For example, the OS 1015 on the physical server 1010 has a hot plug function regarding the I/O device, and uses a hot plug mechanism to disconnect the I/O device allocated to the physical server 1010.

The I/O path alternation instruction module 1013 instructs the PCI manager 1030 to alternate the I/O path in which the failure has occurred. Specifically, the I/O path alternation instruction module 1013 issues an I/O path alternation request to the PCI manager 1030. The I/O path alternation request includes the identifier of the PCI switch in which the failure has occurred and the identifier of the port in which the failure has occurred. The I/O path alternation request may be notified from the physical server 1010 to the PCI manager 1030 through the PCI switch 150b, or may be notified from the physical server 1010 to the PCI manager 1030 through the management-purpose network 102 and the server manager 1040.

The server-originated Tx restart module 1014 restarts the issuance of the transaction bound for the I/O device, which has been inhibited by the server-originated Tx inhibition module 1012. In order to realize the restart, well-known means is used. For example, the OS 1015 has the hot plug function regarding the I/O device, and uses the hot plug mechanism to connect the I/O device allocated to the physical server 1010.

The server-originated Tx inhibition module 1012 and the server-originated Tx restart module 1014 are not limited to a module having the hot plug mechanism as long as the module has a mechanism for controlling a server-originated transaction. For example, in a case where the physical server 1010 includes the hypervisor, the hypervisor may control the server-originated transaction by using the method described as Steps S802 and S808. Further, in a case where the PCI switch 150b connected to the physical server 1010 has a mechanism for controlling the transaction from the physical server 1010, the physical server 1010 need not have the mechanism for controlling the server-originated transaction.

The PCI manager 1030 includes the I/O configuration change module 131, an I/O-originated Tx inhibition instruction module 112d, an I/O configuration change instruction module 113d, an I/O-originated Tx restart instruction module 114d, and an I/O path alternation completion notification module 1031. The I/O-originated Tx inhibition instruction module 112d, the I/O configuration change instruction module 113d, and the I/O-originated Tx restart instruction module 114d are the same as the I/O-originated Tx inhibition instruction module 112a, the I/O configuration change instruction module 113a, and the I/O-originated Tx restart instruction module 114a included in the physical server 110a, which are described in the first embodiment of this invention.

The I/O path alternation completion notification module 1031 notifies the physical server 1010, which has instructed the I/O path alternation, of an I/O path alternation completion. Upon reception of the I/O path alternation completion, the physical server 1010 restarts the server-originated transaction.

Figure 13:
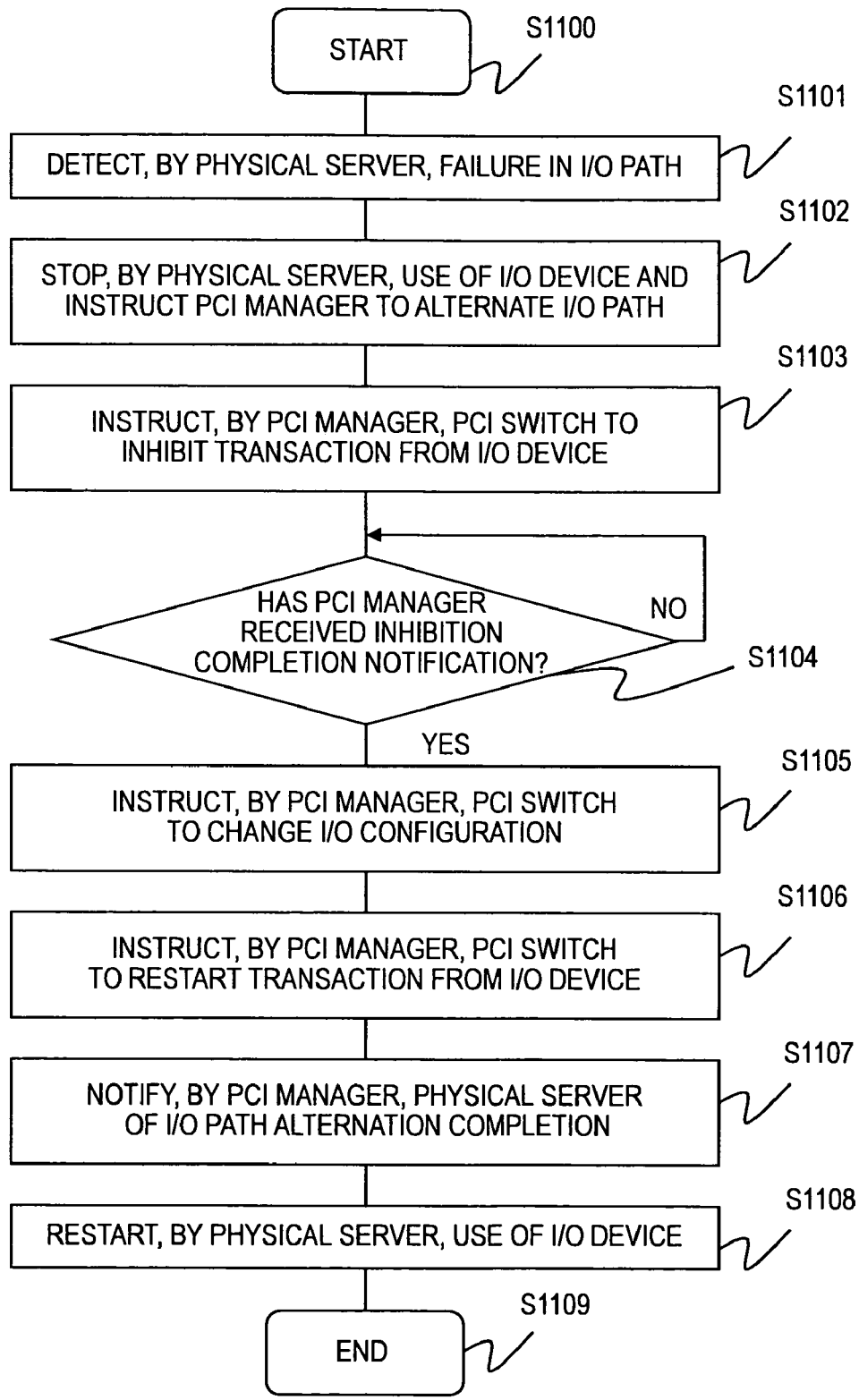
FIG. 13 is a flowchart of an I/O path alternation processing for PCI switches performed in the information processing system.

FIG. 13 is a flowchart of a processing for realizing the I/O path alternation on the PCI switches 150a and 150b. Hereinafter, the I/O path alternation processing shown in FIG. 12 will be described on the assumption that a failure has occurred in the upstream port 151b along the I/O path between the physical server 1010 and the I/O device 120a allocated to the physical server 1010, and the active-system I/O path is failed over to the standby-system I/O path.

The I/O path alternation processing is started at a time when a failure occurs in a path between the PCI switches or other such time (S1100).

First, the physical server 1010 detects that a failure has occurred in, the I/O path (S1101). Specifically, the I/O failure detection module 1011 detects that a failure has occurred in the upstream port 151b of the PCI switch 150a by the advanced error reporting function provided to the PCI-Express switch, for example.

Subsequently, the physical server 1010 inhibits the issuance of the transaction (server-originated transaction) bound for the I/O device 120a using the I/O path in which the failure has occurred, and instructs the PCI manager 1030 to alternate the I/O path (S1102). Specifically, the server-originated Tx inhibition module 1012 uses the hot plug mechanism to disconnect the I/O device 120a. This inhibits the transaction from the physical server 1010 toward the I/O path of an I/O path alternation subject. Further, the I/O path alternation instruction module 1013 issues the I/O path alternation request to the PCI manager 1030. The I/O path alternation request includes the identifier of the PCI switch 150a in which the failure has occurred and the identifier of the upstream port 151b in which the failure has occurred.

Upon reception of the I/O path alternation request, the PCI manager 1030 first inhibits the transaction from the I/O device 120a connected to the I/O path in which the failure has occurred (S1103). Specifically, the I/O-originated Tx inhibition instruction module 112b of the PCI manager 1030 performs writing on the configuration register with respect to the setting register 161 of the downstream port 160a connected to the I/O device 120a through the MMI/O of the PCI switch. This results in the start of the processing of inhibiting, by the Tx inhibition control module 162 of the downstream port 160a, the transaction from the I/O device 120a in the same manner as described above. The flow of the processing of inhibiting the transaction from the I/O device is the same as described above by referring to FIG. 6.

Subsequently, the PCI manager 1030 waits for the inhibition completion notification to be transmitted from the Tx inhibition control module 162 (S1104). If the PCI manager 1030 receives the inhibition completion notification, it is possible to guarantee that the transaction from the I/O device 120a has been inhibited.

Subsequently, the PCI manager 1030 instructs the PCI switches 150a and 150b to change the I/O configuration (S1105). Specifically, the I/O configuration change instruction module 113a of the PCI manager 1030 generates the I/O path alternation information related to the PCI switches 150a and 150b based on information on the standby-system I/O path that avoids the upstream port 151b in which the failure has occurred. The I/O path alternation information related to the PCI switch 150a includes pre-alternation path information "the upstream port 151b and the downstream port 160a" and post-alternation path information "the upstream port 151a and the downstream port 160a". In addition, the I/O path alternation information related to the PCI switch 150b includes pre-alternation path information "the upstream port 151d and the downstream port 160d" and post-alternation path information "the upstream port 151d and the downstream port 160c". Then, the I/O configuration change instruction module 113a issues the I/O configuration change request to the I/O configuration change module 131. The I/O configuration change request includes the above-mentioned I/O path alternation information related to the PCI switches 150a and 150b.

Upon reception of the I/O configuration change request, the I/O configuration change module 131 issues a setting change request to PCI switch management modules 154a and 154b. The setting change request with respect to the PCI switch management module 154a includes the above-mentioned I/O path alternation information related to the PCI switch 150a. In addition, the setting change request with respect to the PCI switch management module 154b includes the above-mentioned I/O path alternation information related to the PCI switch 150b. According to the setting change request, the PCI switch management modules 154a and 154b change the configuration of the port belonging to the corresponding PCI trees. It should be noted that the I/O path alternation processing is not accompanied by the migration of the virtual server, which does not cause a change in the settings of the address conversion table.

Subsequently, the PCI manager 1030 instructs the PCI switch 150a to restart the transaction from the I/O device 120a being the I/O path alternation subject (S1106). Specifically, the I/O-originated Tx restart instruction module 114b of the PCI manager 1030 performs writing on the configuration register with respect to the setting register 161 of the downstream port 160a connected to the I/O device 120a through the MMI/O of the PCI switch 150a. As a result, the Tx inhibition control module 162 of the downstream port 160a restarts the transaction from the I/O device 120a.

Subsequently, the PCI manager 1030 notifies the physical server 1010 of the I/O path alternation completion (S1107). Specifically, the I/O path alternation completion notification module 1031 of the server manager 1040 notifies the physical server 1010 of the I/O path alternation completion through the management-purpose network 102.

When notified of the I/O path alternation completion, the physical server 1010 restarts the server-originated transaction (S1108). Specifically, when notified of the I/O path alternation completion, the server-originated Tx restart module 1014 uses the hot plug mechanism to connect the I/O device 120a.

This results in the restart of the issuance of the transaction from the physical server 1010 to the I/O device 120a.

After the above-mentioned flow of processing, the I/O path alternation processing is completed (S1109). As described above, by performing the I/O path alternation processing, it is possible to realize the I/O path alternation in a state where it is guaranteed that no transaction exists in an alternation-subject I/O path, and to prevent the transaction accompanied by the I/O path alternation processing from being lost.

Modified Example 2

Modified Example 2 is different from Modified Example 1 in that the driver module 1017 of the I/O device 120a includes a mechanism for realizing the I/O path alternation in addition to the I/O failure detection module 1011, the server-originated Tx inhibition module 1012, the I/O path alternation instruction module 1013, and the server-originated Tx restart module 1014 according to Modified Example 1 shown in FIG. 12. The mechanism for realizing the I/O path alternation included in the driver module 1017 is, for example, a mechanism in which a plurality of I/O paths related to the I/O device 120a are managed in cooperation with the I/O device 120a, and those I/O paths are arbitrarily changed.

The I/O path alternation instruction module 1013 of the driver module 1017 instructs the PCI manager 1030 to inhibit the I/O-originated transaction, and at the same time, to alternate the I/O path by using the mechanism for realizing the I/O path alternation which is included in the driver module 1017.

The driver module 1017 includes the mechanism for the I/O path alternation processing, thereby allowing the I/O path alternation to be performed even if the OS 1015 or the application 1016 do not include the mechanism for the I/O path alternation processing. On the other hand, the I/O device 120a and the driver module 1017 need to include the mechanism for the I/O path alternation processing, and hence, Modified Example 2 cannot be applied to a general-purpose I/O device.

Modified Example 3

Modified Example 3 is different from Modified Examples 1 and 2 in that the PCI manager 1030 includes the I/O failure detection module 1011.

In Modified Example 3, the PCI manager 1030 includes the I/O failure detection module 1011 according to Modified Example 1 shown in FIG. 12, and after detecting an I/O path failure, the I/O failure detection module 1011 notifies the physical server 1010 of the I/O path failure. When notified of the I/O path failure, the server-originated Tx inhibition module 1012 of the physical server 1010 inhibits the issuance of the server-originated transaction.

As described above, this invention can be applied to a computer system including the I/O switch, for dynamically changing a connection between the computer and the I/O device, and a computer system for dynamically changing a path within the I/O switch.

While the present invention has been described in detail and pictorially in the accompanying drawings, the present invention is not limited to such detail but covers various obvious modifications and equivalent arrangements, which fall within the purview of the appended claims.

What is claimed is:

1. An information processing system, comprising:
    a physical server including a processor and a memory;
    a virtualization module for virtualizing a computer resource of the physical server to execute a virtual server;
    the physical server comprises a plurality of the physical servers for executing the virtual server; and
    an I/O switch for connecting the plurality of physical servers with one or more I/O devices,
    the virtualization module being configured to perform a migration of the virtual server,
    the I/O switch including:
        a register for storing inhibition instruction information for instructing an inhibition of an issuance of a transaction from the I/O device to the virtual server;
        a transaction inhibition control module for inhibiting, when the inhibition instruction information is stored into the register, the issuance of the transaction from the I/O device to the virtual server to be migrated, and guaranteeing a completion of a transaction issued from the I/O device before the inhibition of the issuance of the transaction;
        a virtualization assist module including an address conversion unit for retaining an association between a memory address of the virtual server and an address thereof within the memory of the physical server that executes the virtual server, for converting the memory address of the virtual server into the address thereof within the memory of the physical server; and
        a switch management module for managing a configuration of the I/O switch,
    the virtualization module including:
        an I/O device management module for managing an association between the virtual server on the physical server and the I/O device allocated to another virtual server;
        a transaction instruction module for identifying the I/O device allocated to a migration-subject virtual server from the I/O device management module, and setting and canceling the inhibition instruction information with respect to the register of the I/O switch correspondent to the I/O device; and
        a configuration change instruction module for instructing the switch management module to change the configuration of the I/O switch, and issuing a command for a change in the address of the physical server to the address conversion unit managed by the virtualization assist module,
    wherein the transaction instruction module is configured to:
        set, at a start of the migration, the inhibition instruction information in the register, and inhibit the issuance of the transaction from the I/O device to the migration-subject virtual server; and
        cancel, when the migration is completed, the inhibition instruction information set in the register, and permit the issuance of a transaction from the I/O device to the virtual server toward which the migration has been completed.

2. The information processing system according to claim 1, further comprising an I/O manager for controlling the switch management module, wherein:
    the I/O manager includes a setting interface for communicating with the virtualization module; and
    the I/O manager controls, when the virtualization module instructs the I/O manager to change the configuration of the I/O switch through the setting interface, the switch management module to change the configuration of the I/O switch.

3. The information processing system according to claim 1, wherein the register includes a field for storing the inhibition instruction information and a field for storing address information.

4. The information processing system according to claim 3, wherein the field for storing address information stores the address of the memory of the migration-subject virtual server.

5. The information processing system according to claim 1, further comprising a server manager for managing the physical server, wherein the server manager includes a start instruction module for instructing the virtualization module to start the migration of the virtual server.

6. The information processing system according to claim 1, wherein:
the I/O switch further comprises:
a first buffer for retaining a transaction issued from the I/O device to the physical server; and
a second buffer for retaining a transaction issued from the physical server to the I/O device; and
the transaction inhibition control module includes:
a transaction inhibition module for inhibiting the issuance of the transaction from the first buffer;
a response-added transaction issuance module for generating a response-added transaction and issuing the response-added transaction to the physical server;
a transaction response confirmation module for monitoring the second buffer and confirming a completion of the response-added transaction; and
a transaction completion notification module for notifying the virtualization module of a completion of the inhibition of the transaction when the transaction response confirmation module confirms the completion of the response-added transaction.

7. The information processing system according to claim 6, wherein the response-added transaction is prevented from overtaking a preceding transaction.

8. An I/O switch for connecting one or more physical servers with one or more I/O devices, comprising:
one or more first ports to which the one or more physical servers are connected; and
one or more second ports to which the one or more I/O devices are connected, wherein:
the second port includes:
a register for retaining inhibition instruction information for instructing an inhibition of an issuance of a transaction from the I/O device;
a first buffer for retaining the transaction issued to the physical server from the I/O device connected to the second port;
a transaction inhibition module for inhibiting the issuance of the transaction from the first buffer when the inhibition instruction information is set into the register; and
a residual transaction completion confirmation module for issuing a response-added transaction request based on the inhibition instruction information after the issuance of the transaction is inhibited by the transaction inhibition module, and confirming a completion of the response-added transaction; and
the second port is configured to guarantee the completion of the transaction issued from the I/O device to the physical server.

9. The I/O switch according to claim 8, wherein the register includes:
a field for storing the inhibition instruction information; and
a field for storing address information.

10. The I/O switch according to claim 8, wherein:
the physical server includes:
one or more virtual servers running on the physical server; and
a virtualization module for managing an association between the one or more virtual servers and the one or more I/O devices allocated to the one or more virtual servers; and
the virtualization module is configured to set the inhibition instruction information with respect to the register.

11. The I/O switch according to claim 10, wherein the I/O switch further includes a virtualization assist module including an address conversion unit for retaining an association between a memory address of the virtual server and an address thereof within a memory of the physical server that executes the virtual server, for converting the memory address of the virtual server into the address thereof within the memory of the physical server; and
wherein the virtualization module further includes a configuration change instruction module for instructing a switch management module of the I/O switch to change a configuration of the I/O switch, and issuing a command for a change in the address of the physical server to the address conversion unit managed by the virtualization assist module.

12. The I/O switch according to claim 8, wherein:
the second port includes a second buffer for retaining a transaction issued from the physical server to the I/O device connected to the second port; and
the residual transaction completion confirmation module includes:
a response-added transaction issuance module for generating the response-added transaction and issuing the response-added transaction to the physical server; and
a transaction response confirmation module for monitoring the second buffer and confirming the completion of the response-added transaction.

13. The I/O switch according to claim 8, wherein the second port includes a transaction restart module for restarting the issuance of the transaction issued from the first buffer that retains the transaction issued from the I/O device to the physical server when the inhibition instruction information in the register is canceled.

14. The I/O switch according to claim 8, wherein the response-added transaction is prevented from overtaking a preceding transaction.

15. An I/O path alternation processing method of switching I/O paths set in an I/O switch in an information processing system in which one or more servers are connected with one or more I/O devices through one or more I/O switches,
the I/O switch including:
a register for retaining inhibition instruction information for instructing an inhibition of an issuance of a transaction from an I/O device;
a first buffer for retaining the transaction issued from the I/O device connected to the I/O switch to a server to which the I/O device is allocated;
a transaction inhibition control module for inhibiting the issuance of the transaction issued from the first buffer when the inhibition instruction information is set into the register, and transmitting a notification of a completion of a transaction issued from the I/O device before the inhibition of the issuance of the transaction; and
a switch management module for managing a configuration of the I/O switch, the I/O path alternation processing method comprising:
  inhibiting the issuance of the transaction to the server from the I/O device allocated to the server;
  setting the inhibition instruction information with respect to the register;
  changing, upon reception of the notification of the completion from the transaction inhibition control module, a configuration of the I/O device allocated to the server;
  canceling the inhibition instruction information set in the register; and
  permitting the issuance of a transaction from the I/O device to the server.

16. The I/O path alternation processing method according to claim 15, wherein the I/O switch further includes a virtualization assist module including an address conversion unit for retaining an association between a memory address of a virtual server running on a server and an address thereof within a memory of the server that executes the virtual server, for converting the memory address of the virtual server into the address thereof within the memory of the server; and
  wherein a virtualization module for virtualizing a computer resource of the server to execute the virtual server includes a configuration change instruction module for instructing the switch management module of the I/O switch to change the configuration of the I/O switch, and issuing a command for a change in the address of the physical server to the address conversion unit managed by the virtualization assist module.

* * * * *